2,843,209
FILTER, ESPECIALLY FOR PIPED WELLS

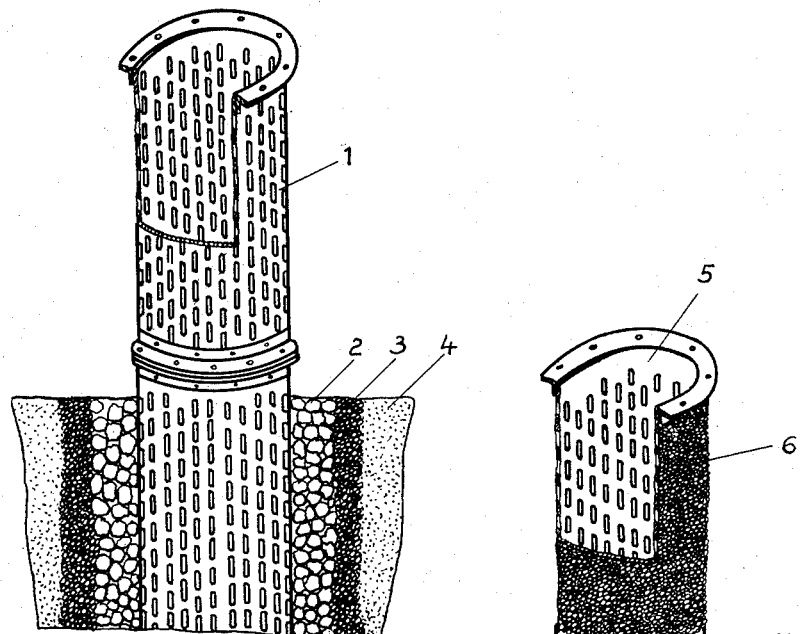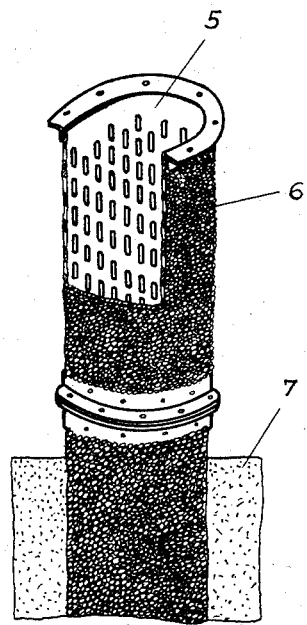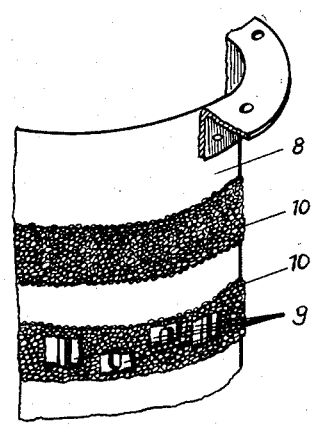

Wilhelm Degen, Frankfurt am Main, Germany

Application December 27, 1952, Serial No. 328,219

Claims priority, application Germany December 29, 1951

5 Claims. (Cl. 166—228)

The present invention relates to filters, and more particularly to unitary well filters.

Filters for wells or similar purposes have been made of lengths of perforated or slotted pipe of circular or other cross section, which are surrounded by fine-mesh wire gauze to prevent the penetration of fine soil into the interior of the pipe. The pipe may be of sheet metal, ceramic or porcelain and the lengths of pipe are connected together with flange joints or other suitable means.

Despite higher manufacturing costs, it has also been suggested to use porous gravel layers as filters in wells and such filters have been preferred in practical use, particularly since the metal gauze filters had only a short service life because the metal gauze could not be replaced economically with a corrosion-resistant material.

In these latter filters, the perforated or slotted pipes are surrounded by one or more filtering gravel layers concentrically poured or loosely packed around the filter pipe in the borehole. The water or other liquid to be filtered penetrates the interior of the pipe through the perforations or slots therein, the pipe serving to support the surrounding gravel layer(s). The innermost gravel layer in contact with the pipe must consist of a granular material exceeding in grain size the dimensions of the pipe perforations. The outermost layer, on the other hand, which is in contact with the surrounding soil, must consist of such fine grains that sand and similarly small soil particles cannot penetrate therethrough. Since both of these requirements usually cannot be met by a single size of grain, it is necessary, particularly in sandy soil, to use filters with at least two, mostly three filtering gravel layers of varying grain size.

In accordance with the present invention, the fine-mesh wire gauze is replaced by a permeable filter body of granular material, for instance gravel, which is cemented together by a binding agent which is insoluble by water or other liquid to be filtered and which is permanently adhered to the perforated pipe. The binding agent may be, for example, an artifical resin, such as polyvinylchloride. The grain size of the gravel may be adapted to the soil surrounding the filter.

Such a filter will combine the advantageous properties of the metal guaze type filter with the corrosion-resistant properties of the gravel type filter, at the same time avoiding the disadvantages of both.

Compared with the gravel type filters, the pipe filters of the present invention have the following advantages:

(1) Only one layer of gravel, whose grain size corresponds to the requirements of the surrounding soil, will be necessary instead of the multiple layers of various grain sizes. This makes it possible to reduce the diameter of the borehole considerably with concomitant cutting of boring expenses.

(2) The grain size need not be adapted to the dimensions of the pipe perforations since the grains are firmly united with the filter pipe by the insoluble binding agent and cannot get into the well through the slits. On the other hand, the slit dimensions can be larger than in the case of the prior art gravel filters, resulting in most cases in a reduction in manufacturing cost.

(3) The well will produce clear water more dependably because the gravel filter layer can be pre-fabricated under factory controls rather than being manufactured on the building site.

(4) Filter pipes with the firmly attached gravel filter can be utilized also in horizontal wells where a serviceable, corrosion-resistant filter, particularly for water supplies in fine sand, did not exist at all.

Compared with the metal gauze filters, the gravel filters of this invention have the following advantages:

(1) By replacing the metal gauze with the thin gravel layer adhered to the pipe, the service life of the filter is extended to the same length as in the prior art gravel type filters.

(2) Experience has shown that the fine-mesh metal gauze filters have a tendency of becoming clogged up with fine particles of the surrounding soil, which just fit into the mesh holes or are slightly larger. During use of the well, the finest soil components begin to shift and, in time, more and more of the mesh will become clogged. In the case of round gravel grains forming the filter, this clogging cannot occur since the fine soil particles can accumulate only at certain points in front of the grain interspaces and will leave wedge-shaped filter openings free.

The invention will now be more fully described in connection with certain now preferred embodiments thereof, taken in conjunction with the accompanying drawing, wherein Fig. 1 illustrates a prior art filter pipe with a double-layer poured gravel jacket;

Fig. 2 is a perspective view of a filter pipe according to the invention; and

Fig. 3 illustrates a portion of a filter pipe in accordance with another embodiment of the invention.

Fig. 1 illustrates slotted filter pipe 1 surrounded by a filtering layer of gravel 2, the grain size of the gravel exceeding the width of the pipe slots. Concentrically surrounding the first layer 2 is a second gravel layer 3 of finer gravel, the grain size of the latter layer being so chosen as to bar penetration of the fine particles of surrounding soil 4.

As shown in Fig. 2, filter pipe 5 is surrounded by covering layer 6 which is formed of gravel united with an insoluble binding agent. The size of the gravel grains depends on surrounding soil 7.

Fig. 3 illustrates an embodiment of the invention wherein the pipe 8 is only intermittently perforated by rings of slots 9 (shown uncovered only for illustrative purposes), permanent annular gravel layers 10 covering the slots in corresponding rings.

While the invention has been described in connection with certain now preferred embodiments and as applied to well pipes, it will be obvious to the skilled in the art that it can be utilized in other filtering devices, for instance for technical filtering installations.

What I claim is:

1. A unitary filter consisting of a perforated member and a permeable filter body of granular material, said granular material being cemented together by an insoluble binding agent and being permanently adhered to the perforated member.

2. A unitary well filter consisting of a perforated well pipe portion and a porous filter body essentially consisting of a granular material and an insoluble binding agent cementing said granular material together and adhering it to the surface of the perforated well pipe portion, the pores of said filter body being of a size to retain the fine particles of the surrounding soil.

3. A unitary well filter as defined in claim 2, wherein said granular material is gravel.

4. A unitary well filter as defined in claim 2, wherein said filter body is adhered to the outer surface of the well pipe.

5. A unitary well filter as defined in claim 2, wherein the filter body is adhered to the well pipe only at its perforated parts.

References Cited in the file of this patent
UNITED STATES PATENTS

| | | |
|---|---|---|
| 968,226 | Ziller | Aug. 23, 1910 |
| 1,992,718 | Records | Feb. 26, 1935 |
| 2,303,134 | O'Donnell | Nov. 24, 1942 |
| 2,392,263 | Records | Jan. 1, 1946 |